United States Patent
Namm et al.

(10) Patent No.: US 12,322,397 B2
(45) Date of Patent: Jun. 3, 2025

(54) PROCESSING AUDIO INFORMATION CAPTURED BY INTERACTIVE VIRTUAL ASSISTANT

(71) Applicant: MOTOROLA SOLUTIONS, INC., Chicago, IL (US)

(72) Inventors: Joseph Namm, Plantation, FL (US); Melanie King, Wesley Chapel, FL (US); Jeet K. Pawani, Sunrise, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 284 days.

(21) Appl. No.: 18/147,902

(22) Filed: Dec. 29, 2022

(65) Prior Publication Data
US 2024/0221759 A1     Jul. 4, 2024

(51) Int. Cl.
*G10L 15/22*     (2006.01)
*G10L 17/22*     (2013.01)

(52) U.S. Cl.
CPC ................................... *G10L 17/22* (2013.01)

(58) Field of Classification Search
CPC ......... G10L 15/22; G10L 17/22; G10L 17/26; G08B 15/00
See application file for complete search history.

(56) References Cited

U.S. PATENT DOCUMENTS

| | | | |
|---|---|---|---|
| 8,055,534 B2 | 11/2011 | Ashby et al. | |
| 10,380,852 B2 * | 8/2019 | Horling | G08B 13/1672 |
| 11,170,089 B2 | 11/2021 | Goldstein et al. | |
| 2018/0330589 A1 * | 11/2018 | Horling | G08B 15/002 |
| 2020/0035239 A1 * | 1/2020 | Ni | G10L 17/22 |

(Continued)

FOREIGN PATENT DOCUMENTS

JP     7204283 B2 *   1/2023

OTHER PUBLICATIONS

Dasgupta, et al., "Audio Analytics-based Human Trafficking Detection Framework for Autonomous Vehicles," Alabama Transportation Institute, <https://arxiv.org/ftp/arxiv/papers/2209/2209.04071.pdf> webpage accessed Dec. 15, 2022 (16 pages).

(Continued)

*Primary Examiner* — Daniel Abebe
(74) *Attorney, Agent, or Firm* — Michael Best & Friedrich LLP

(57) ABSTRACT

Methods and systems for processing audio information captured by an interactive virtual assistant (IVA). An example method includes: converting sound received by a microphone into electrical signals; generating voiceprints corresponding to voices represented in the electrical signals; distinguishing signals representing background speech and signals representing voice commands directed at the IVA; and based on various signals representing background speech and voice commands, labeling each of the voiceprints with a tag selected from the group consisting of an IVA interactor occupant tag, an IVA non-interactor occupant tag, and a non-occupant tag. The method also includes transmitting, in response to a trigger event, a message with at least one of an estimated number of occupants in a geofenced area corresponding to the IVA and an alert reporting an indication of unlawful activity thereat.

20 Claims, 4 Drawing Sheets

(56) References Cited

U.S. PATENT DOCUMENTS

| | | | |
|---|---|---|---|
| 2021/0249033 A1* | 8/2021 | Hsu | G10L 25/30 |
| 2021/0326421 A1* | 10/2021 | Khoury | G10L 17/08 |
| 2022/0115032 A1* | 4/2022 | Iwagaki | G06F 16/35 |
| 2024/0112681 A1* | 4/2024 | Rohatgi | G10L 17/22 |
| 2024/0195905 A1* | 6/2024 | Guan | H04M 1/67 |

OTHER PUBLICATIONS

Podder, et al., "Designing Intelligent Automation based Solutions for Complex Social Problems," ICML Workshop on #Data4Good: Machine Learning in Social Good Applications, <https://arxiv.org/pdf/1606.05275.pdf> 2016 (5 pages).

* cited by examiner

PROCESSING AUDIO INFORMATION CAPTURED BY INTERACTIVE VIRTUAL ASSISTANT

BACKGROUND OF THE INVENTION

An interactive virtual assistant (IVA) includes a software agent that performs tasks or services for an individual based on commands or questions from that individual. Some IVAs interpret human speech and respond via synthesized voices. For example, users can ask their IVAs questions, control home automation devices and media playback via voice, and manage other basic tasks, such as email, to-do lists, and calendars, with verbal commands. Additional terms used in the literature to refer to IVAs include "intelligent virtual assistant" and "intelligent personal assistant."

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features of concepts that include the claimed subject matter and explain various principles and advantages of those embodiments, examples, aspects, and features.

Figure 1:
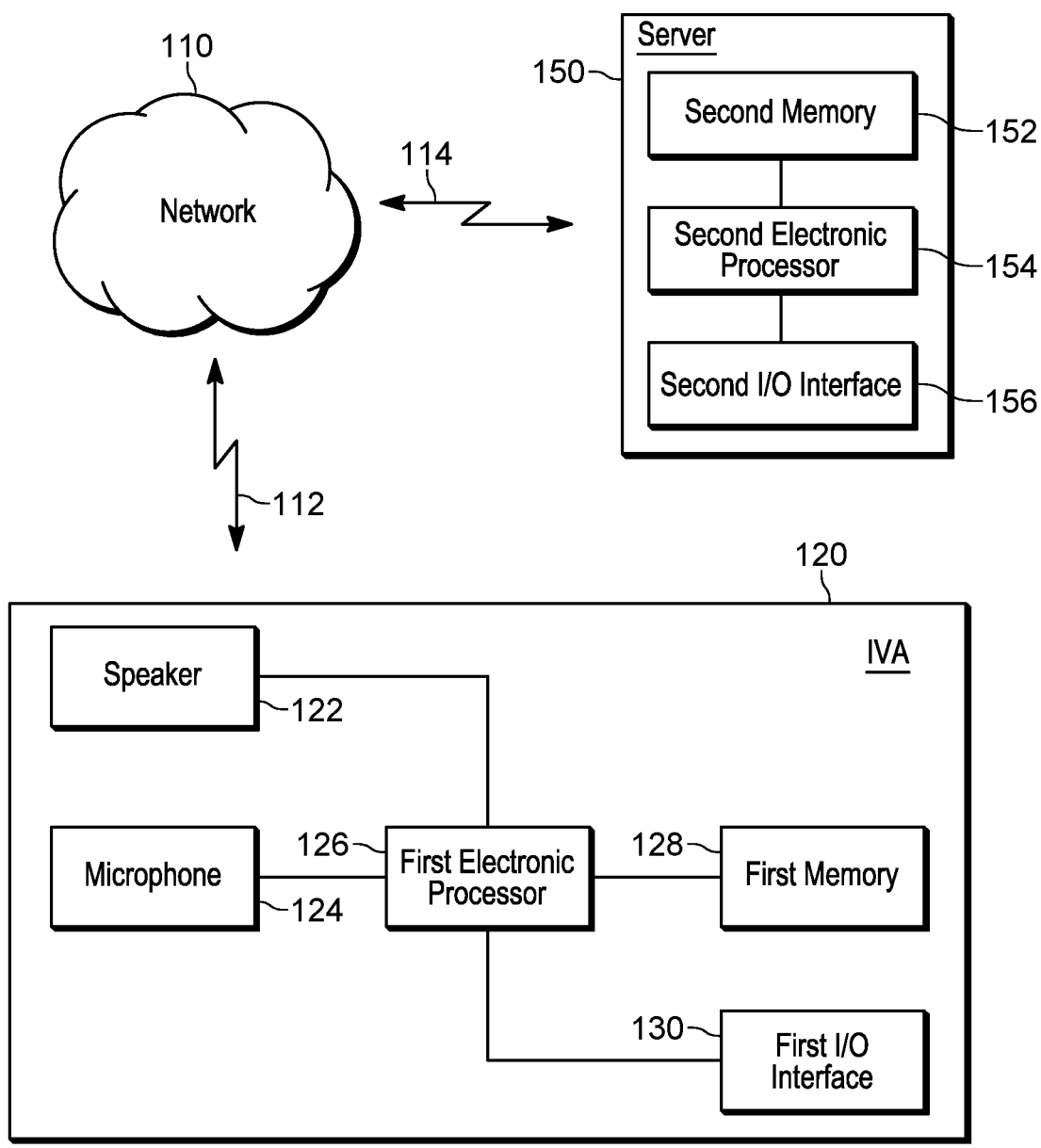
FIG. 1 is a block diagram illustrating a communication system according to some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments, examples, aspects, and features.

The apparatus and method components have been represented where appropriate by conventional symbols in the drawings, showing only those specific details that are pertinent to understanding the embodiments, examples, aspects, and features so as not to obscure the disclosure with details that will be readily apparent to those of ordinary skill in the art having the benefit of the description herein.

DETAILED DESCRIPTION OF THE INVENTION

In various examples, IVAs work via text, voice, and/or by taking or receiving images. Some IVAs are accessible via multiple methods, for example, by voice and text. Some IVAs use natural language processing (NLP) to match user text or voice input to executable commands. Some IVAs continually learn using artificial intelligence techniques, including machine learning and ambient intelligence. In some examples, to activate a virtual assistant via voice, a wake phrase needs to be used. A wake phrase is a specific word or group of words recognized by the system as a precursor to a voice command or question. Example wake phrases for some IVAs available in the market are "Hey Siri," "OK Google," "Alexa," and "Hey Microsoft."

As described herein, IVAs can be used to identify victims of unlawful activities and facilitate responses, by public safety officers, directed at preventing or curbing crime. For example, detecting involuntary domestic servitude is a difficult task because such servitude can typically be disguised under the appearance of a lawful engagement, such as a visiting relative, a nanny, a maid, and the like. However, unlike any of those lawful engagements, involuntary domestic servitude is a form of human trafficking in which a domestic worker is not free to leave his or her employment and is typically abused and underpaid, if paid at all.

The above-indicated and possibly some associated problems can beneficially be addressed using at least some embodiments disclosed herein. More specifically, an example embodiment is based on the ability of an IVA to hear voices and capture the corresponding audio signals. By processing the captured audio signals in the disclosed manner, the IVA operates to determine whether there is an occupant of the corresponding geofenced area who does not interact with the IVA in a substantial manner. When such an occupant is detected, the IVA operates to further analyze the corresponding audio signals for the presence of certain behavioral patterns. When a behavioral pattern is detected, the IVA operates to transmit an alert message reporting the behavioral pattern to a corresponding cloud or network entity, such as an application server, having a suitable application programming interface (API) in communication with an API of a government service, such as a law-enforcement agency or a child welfare agency. The agency can then launch an investigation or other appropriate response with respect to the reported behavioral pattern at the geofenced area of the source IVA.

One example described herein provides an apparatus implementing an IVA. The apparatus comprises a microphone to convert received sound into electrical signals, a communication interface, and an electronic processor connected to the microphone and the communication interface. The electronic processor is configured to: (i) generate a plurality of voiceprints corresponding to a plurality of voices represented in the electrical signals; (ii) distinguish, in the electrical signals, signals representing background speech and signals representing voice commands directed at the IVA; and (iii) based on the signals representing background speech and the signals representing voice commands, label each of the voiceprints with a suitable tag. The tags are selected from the group consisting of an IVA interactor occupant tag, an IVA non-interactor occupant tag, and a non-occupant tag. The electronic processor is further configured to, in response to a trigger event, transmit, through the communication interface, a message with at least one of an estimated number of occupants in a geofenced area corresponding to the IVA and an alert reporting an indication of unlawful activity in the background speech.

Another example provides a method of processing audio information captured by an IVA for a public safety purpose. The method includes: (i) converting sound received by a microphone into electrical signals; generating, with an electronic processor, a plurality of voiceprints corresponding to a plurality of voices represented in the electrical signals; (ii) distinguishing, with the electronic processor, in the electrical signals, signals representing background speech and signals representing voice commands directed at the IVA; and (iii) based on the signals representing background speech and the signals representing voice commands, labeling, with the electronic processor, each of the voiceprints with a suitable tag. The tags are selected from the group consisting of an IVA interactor occupant tag, an IVA non-interactor occupant tag, and a non-occupant tag. The method further includes, in response to a trigger event, transmitting, through a communication interface connected to the electronic processor, a message with at least one of an estimated number of occupants in a geofenced area corresponding to the IVA and an alert reporting an indication of unlawful activity in the background speech.

Yet another example provides a non-transitory computer-readable medium storing instructions, that when executed by an electronic processor, perform a set of functions. The set of functions includes: (i) converting sound received by a microphone into electrical signals; generating, with an electronic processor, a plurality of voiceprints corresponding to a plurality of voices represented in the electrical signals; (ii) distinguishing, with the electronic processor, in the electrical signals, signals representing background speech and signals representing voice commands directed at the IVA; and (iii) based on the signals representing background speech and the signals representing voice commands, labeling, with the electronic processor, each of the voiceprints with a suitable tag. The tags are selected from the group consisting of an IVA interactor occupant tag, an IVA non-interactor occupant tag, and a non-occupant tag. The set of functions further includes, in response to a trigger event, transmitting, through a communication interface connected to the electronic processor, a message with at least one of an estimated number of occupants in a geofenced area corresponding to the IVA and an alert reporting an indication of unlawful activity in the background speech.

FIG. 1 is a block diagram of a communication system 100 according to some examples. In the example illustrated, the system 100 includes an IVA 120 and a networked computing device (for example, a server) 150. The IVA 120 and the server 150 are connected to a network 110 via communication links 112 and 114, respectively. In various examples, the network 110 includes a plurality of computing and communication devices, such as computers, terminals, network nodes, servers, cloud-based computing devices, routers, relays, access points, switches, and additional communication links. In operation, the network 110 provides for bidirectional communications between the IVA 120 and the server 150.

In the example shown, the IVA 120 includes a speaker 122, a microphone 124, a first electronic processor 126 (for example, a microprocessor, a central processing unit, or another electronic processing circuit), a first memory 128, and a first input/output (I/O) interface 130. The microphone 124 receives sound from the environment and has circuitry to convert the received sound into digital electrical signals, which are provided to the electronic processor 126 and/or the memory 128. In various examples, the received sound includes voice commands directed at the IVA 120 and/or background speech. The speaker 122 receives digital electrical signals from the electronic processor 126 and has circuitry to convert the received digital electrical signals into sounds. In various examples, the sounds generated by the speaker 122 convey synthesized voices, music, prerecorded speech, and other audio signals.

The I/O interface 130 includes suitable circuits and devices that enable the IVA 120 to receive various inputs from external devices and data sources and to transmit various outputs to external devices and data sinks. In one example, the I/O interface enables communicative connection of the IVA 120 to the network 110 via the communication link 112. In some examples, the I/O interface 130 is also used to connect the IVA 120 to a display or other local human interface device.

In some examples, the memory 128 includes nonvolatile memory (NVM) and buffers. The memory 128 operates to share the data with the electronic processor 126, which applies thereto, for example, various operations of the methods described herein. The memory 128 also operates to store program code, which when executed by the electronic processor 126 enables the IVA 120 to perform various operations associated with IVA functions in accordance with the program code. In some examples, the program code implements computer models, data filtering, generation of control messages or commands, and other computing operations for various components of the IVA 120.

The server 150 includes a second memory 152, a second electronic processor 154, and a second I/O interface 156. In a representative example, these components of the server 150 are functionally similar to the like-named components of the IVA 120 described above. In some examples, the server 150 comprises a specialized computer or machine capable of executing instructions (sequential or otherwise) that specify actions to be taken by that machine. In some examples, the functionality of the electronic processor 154 can be implemented by two or more co-located electronic processors or two or more electronic processors placed at different respective physical locations. In other words, although FIG. 1 shows a single second electronic processor 154, the shown electronic processor may represent multiple electronic processors of variously distributed computing devices.

In operation, the server 150 communicates, via the I/O interface 156, with other devices of the system 100 to receive, store, and process/analyze information and to control and/or influence operations of other devices as explained in more detail below. Such other devices include, for example, the IVA 120 and one or more application programming interfaces (APIs) provided by the above-mentioned government agencies. The server 150 bidirectionally communicates with the IVA 120 via the link 114, network 110, and link 112. In some examples, the server 150 performs or is capable of supporting at least an additional functionality in addition to various functionalities described herein.

Figure 2:
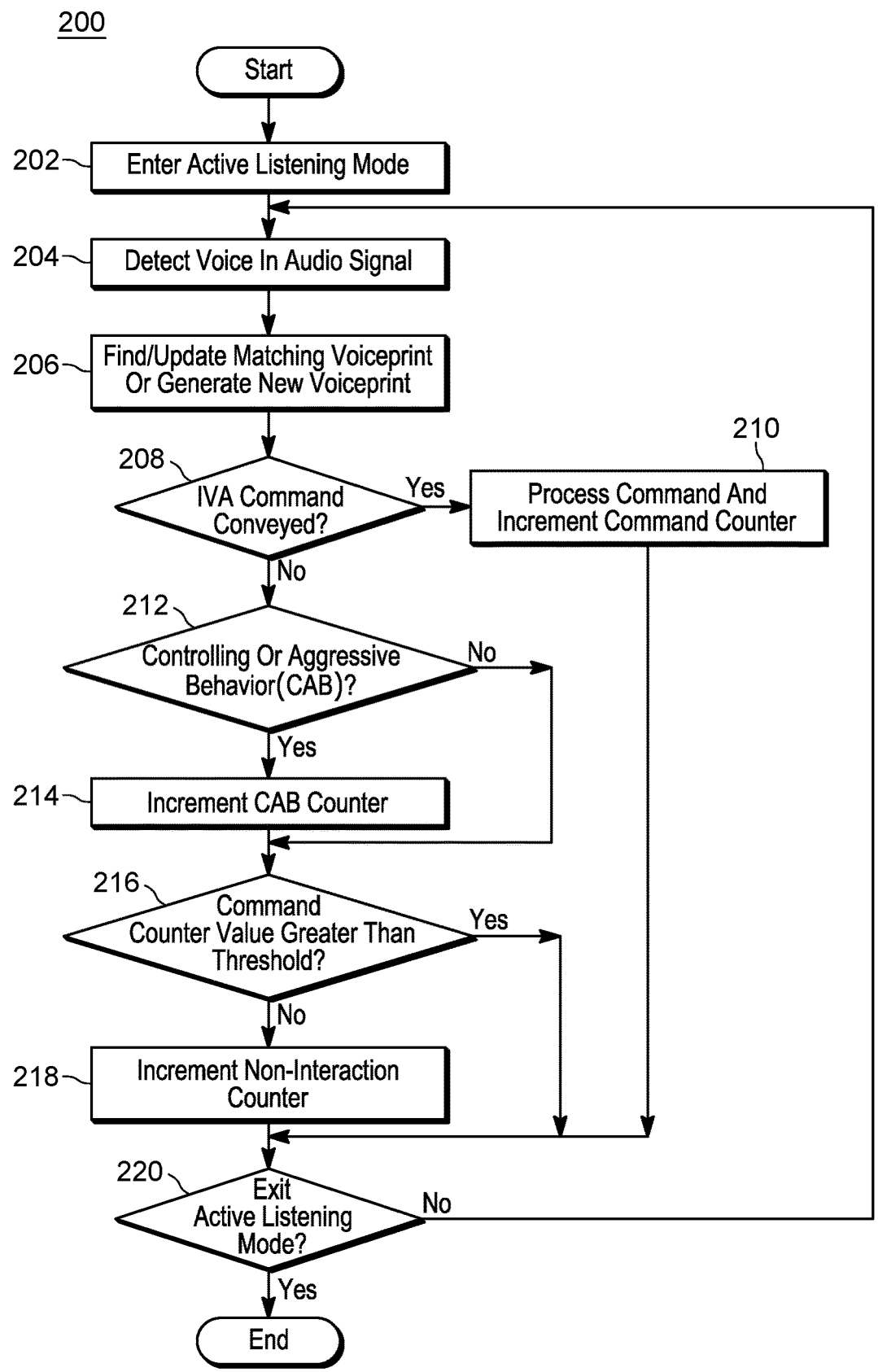
FIG. 2 is a flowchart illustrating a method for processing audio captured in the communication system of FIG. 1 according to some examples.
Figure 3:
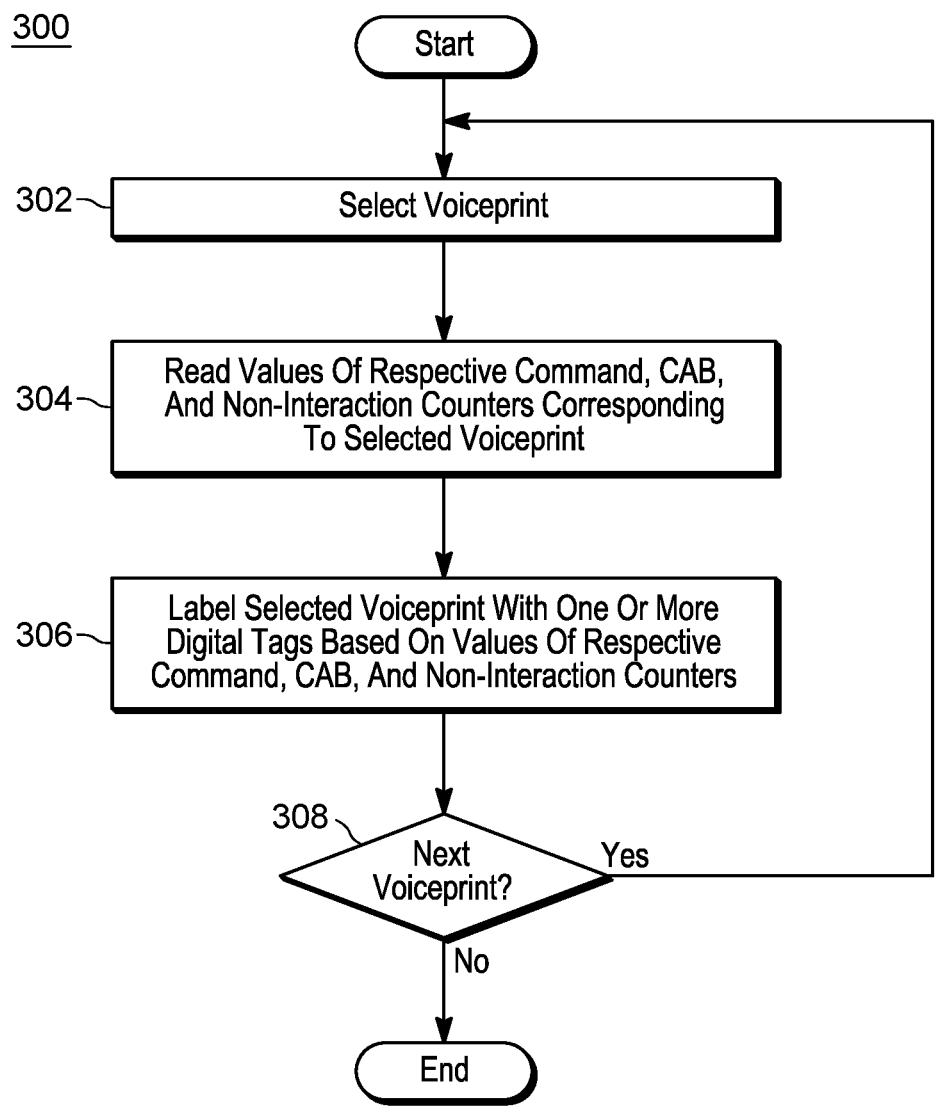
FIG. 3 is a flowchart illustrating a method of labeling voiceprints in the communication system of FIG. 1 according to some examples.
Figure 4:
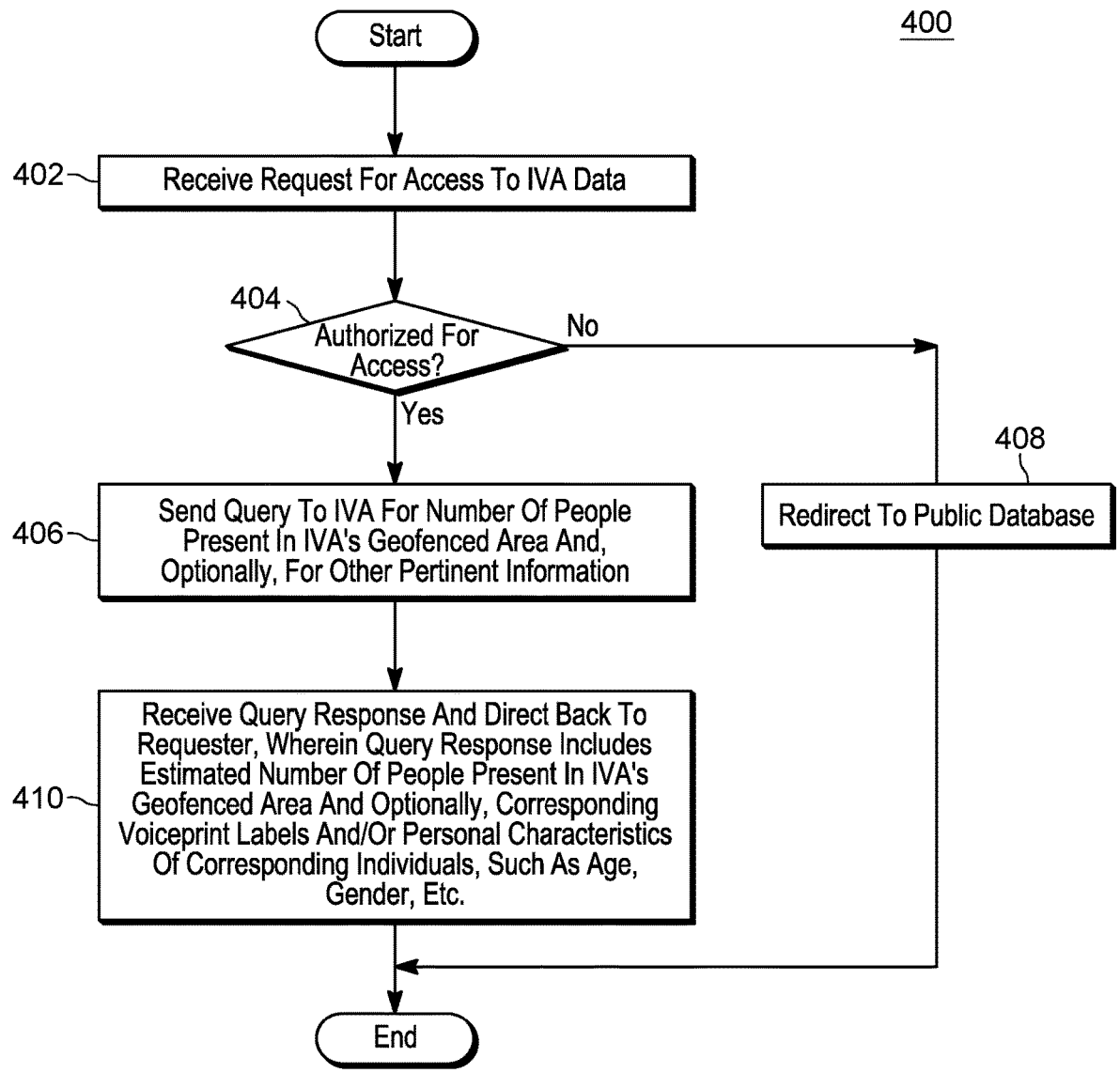
FIG. 4 is a flowchart illustrating a method of determining the number of people present in the geofenced area of the IVA in the communication system of FIG. 1 according to some examples.

FIGS. 2-4 show flowcharts illustrating example methods implemented in the system 100 according to various embodiments. A method 200 illustrated in FIG. 2 is implemented at the IVA 120. The method 200 is run in the background when the IVA 120 is in the active listening mode and is directed, inter alia, at (i) identifying voices corresponding to different individuals based on audio received via the microphone 124 in the form of IVA commands and background speech and (ii) collecting statistical data representing patterns of interaction of the various voices with the IVA 120 and each other. In an example embodiment, the statistical data are represented by various counter values and timestamps, as described in more detail below in reference to FIG. 2. A method 300 illustrated in FIG. 3 is implemented at the IVA 120 and is directed at classifying the various voices based on the statistical data collected via the method 200, with the applied classification being designed and configured to be useful for a public safety purpose, such as estimating the number of people present in the geofenced area of the IVA 120 at a time of a public safety incident and/or generating public safety alerts to flag possible instances of involuntary domestic servitude in the geofenced area of the IVA 120. The method 300 is run at the IVA 120 from time to time, e.g., at regular time intervals or when it is determined that substantial amounts of new statistical data are generated via the method 200. A method 400 illustrated in FIG. 4 is implemented at the server 150 and is triggered by a corresponding request from a public safety entity. The method 400 is directed at providing the public safety team with access to parts of the information generated at the IVA 120 via the methods 200 and 300 when such information is deemed to be of significance to a corresponding public safety action.

FIG. 2 is a flowchart illustrating a method 200 for processing audio captured by the microphone 124 in the IVA 120 according to example embodiments. The method 200 is described below with continued reference to both FIGS. 1 and 2. As indicated above, the method 200 uses a plurality of counters to generate statistical data. For example, statistical data corresponding to a voiceprint can be represented by respective values of command, non-interaction, and controlling or aggressive behavior (CAB) counters. The command counter value M counts IVA commands attributed to the voiceprint. The non-interaction counter value K counts instances of non-command speech attributed to the voiceprint. The CAB counter value N counts instances of controlling or aggressive behavioral patterns in the background speech attributed to the voiceprint.

The method 200 includes the IVA 120 entering the active listening mode of operation (in a block 202). In the active listening mode, the microphone 124 is turned on and generates audio signals in response to received sound. In some examples, the audio signals are buffered in the memory 128.

The electronic processor 126 processes the audio signals to detect voice (in a block 204). In one example, the electronic processor 126 executes, in the block 204, operations on the audio signals in accordance with speech recognition software configured to detect human speech and, in some cases, transcribe the speech into text. In some instances, the speech recognition software: (i) breaks down the audio recording into individual sounds, (ii) applies a suitable algorithm to analyze a sequence of sounds and to find a most probable word fit to the sequence in the corresponding language, and (iii) transcribes the word fit into text. In some examples, the speech recognition software uses NLP and relies on deep learning neural networks.

The method 200 also includes the electronic processor 126 further processing (in a block 206) selected portions of the audio signals recognized as speech in the block 204. In some instances, processing includes (i) finding in the memory 128 a matching digital voiceprint corresponding to the selected portions of the buffered audio signals or (ii) generating a new digital voiceprint corresponding to the selected portions of the audio signals when the match is not found. Herein, the term "digital voiceprint" refers to a digital model of unique vocal characteristics of an individual. In some instances, models are created by a specialized software program when the program is applied to process digital speech samples presented thereto, for example, in the WAV file format. In a one example, the digital voiceprints generated in various instances of the block 206 are stored in the memory 128, which can be accessed by the electronic processor 126 looking for a voiceprint match at a later time.

In one example, a digital voiceprint is created in the block 206 by performing feature extraction from the speech samples. The feature extraction creates personalized vectors related to certain speech attributes. The personalized vectors are then used to create a Universal Background Model (UBM) that enables the electronic processor 126 to match and attribute future speech samples representing IVA commands or background speech to a particular digital voiceprint. In another example, a digital voiceprint is created in the block 206 using a deep neural network (DNN), which is trained using deep learning approaches.

In some examples, after having been matched to a speech sample, the matched digital voiceprint is updated in the block 206 to improve the accuracy of voice representation, with the update being based on the latest voice sample acquired in the block 204. In general, the accuracy of voice representation (which is a measure of the voiceprint quality) improves with an increase in the number of speech samples processed by the voiceprint generating software. Upon reaching a certain quality level, the updated voiceprint is further processed in the block 206 to determine a set of estimated personal characteristics attributed to the corresponding individual. Depending on the specific implementation, such personal characteristics may include one or more of the individual's age, gender, accent, dialect, and speech abnormality (if any).

In another part of the method 200, the electronic processor 126 determines (in a decision block 208) whether the voice detected in the block 204 conveys an IVA command. In one example, the determination made in the decision block 208 is based on the presence or absence of a wake phrase to which the IVA 120 is programmed to react. When the wake phrase is present ("Yes" at the decision block 208), the processing of the method 200 is directed to a block 210. When the wake word is not present ("No" at the decision block 208), the processing of the method 200 is directed to a decision block 212.

Once an IVA command is detected, the electronic processor 126 processes the detected IVA command (in the block 210). In various examples and depending on the IVA command type, the processing implemented in the block 210 includes various operations. For example, operations may include: (i) answering the user's question via synthesized speech or text; (ii) controlling a home automation device, appliance, or media playback device; and (iii) managing an email application, a to-do list, or a schedule, or a combination of the foregoing. The processing implemented in the block 210 also includes incrementing a respective command counter value M for the voiceprint corresponding to the IVA command that is being processed in the block 210. The command counter operates to count a cumulative number of IVA commands attributed to this voiceprint over a range of dates or over a time interval. In some examples, the command counter also registers the timestamp(s) of the one or more most recent IVA commands counted thereby. In various examples, readings of the command counter values are useful in the voiceprint labeling process described in more detail below in reference to FIG. 3. For example, different values M of the command counter can be interpreted to determine whether the voiceprint represents an IVA interactor or an IVA non-interactor, as described below. In addition, voiceprints for which the values of the command counter are relatively low may indicate potential victims of involuntary domestic servitude or visitors to the geofenced area corresponding to the IVA 120, whereas voiceprints for which the values of the command counter are relatively high typically point to occupants of the geofenced area corresponding to the IVA 120.

In examples where IVA commands are not conveyed, the method 200 includes the electronic processor 126 processing (in the decision block 212) selected portions of the audio signals recognized as speech in the block 204 to detect the presence of a CAB pattern (if any). In some examples, the presence of the CAB pattern is detected in the decision block 212 based on at least one of: (i) an aggressive or threatening posture of the speech, for example, as judged by the volume profile and/or spectral (frequency) content and spectral dynamics of the selected portions; and (ii) usage in the speech of one or more keywords from a set of keywords. In one example, the set of keywords includes words indicating coercion, manipulation, exploitation, and explicitly unlawful activity. When a CAB pattern is detected ("Yes" at the decision block 212), the processing of the method 200 is directed to a block 214. When a CAB pattern is not detected ("No" at the decision block 212), the processing of the method 200 is directed to a decision block 216.

In some instances, the electronic processor 126 increments the CAB counter value N (in the block 214). The CAB counter value N counts a cumulative number of instances in which a CAB pattern is detected, over a range of dates, in the speech corresponding to the voiceprint of the preceding block 206. In some examples, the CAB counter also registers the timestamp(s) of the one or more most recent CAB patterns counted thereby. In various examples, readings of the CAB counters are useful in the voiceprint labeling process described in more detail below in reference to FIG. 3. For example, a relatively large value N of the CAB counter may point to a potential perpetrator of involuntary domestic servitude.

In examples where IVA commands are counted, the method 200 may also include the electronic processor 126 comparing (in a decision block 216) a current value M of the command counter for the voiceprint of the preceding block 206 with a fixed threshold value $M_0$. In one example, the fixed threshold value is $M_0=1$. In other examples, other suitable values of $M_0$ can also be used. When $M \geq M_0$ ("Yes" at the decision block 216), the processing of the method 200 is directed to a block 220. Otherwise ("No" at the decision block 216), the processing of the method 200 is directed to a block 218.

In some instances, a non-interaction counter is used. In those instances, the electronic processor 126 increments a value K of the non-interaction counter (in the block 218). The non-interaction counter operates to count a cumulative number of instances in which non-command speech is detected, over a range of dates, for the voiceprint corresponding to the preceding block 206. In some examples, the non-interaction counter also registers the timestamp(s) of the one or more most recent instances of non-command speech counted thereby. In various examples, readings of the non-interaction counter values are useful in the voiceprint labeling process described in more detail below in reference to FIG. 3. For example, voiceprints for which the values K of the non-interaction counters are relatively high may indicate potential victims of involuntary domestic servitude.

The IVA remains active for a limited amount of time. In one example, the electronic processor 126 determines whether the IVA 120 should exit the active listening mode (in the decision block 220). A decision to exit can be made in the decision block 220 for various operational reasons, such as, for example, prolonged silence/inactivity or an explicit instruction from one of the authorized users. When the decision is to exit ("Yes" at the decision block 220), the method 200 is terminated. When the decision is to remain in the active mode ("No" at the decision block 220), the processing of the method 200 is directed back to the block 204.

FIG. 3 is a flowchart illustrating a method 300 of labeling voiceprints with digital tags according to some examples. The voiceprints that are tagged using the method 300 are generated and updated in the IVA 120 using the method 200 as described above. Each of the voiceprints is characterized by respective values of the command, CAB, and non-interaction counters, which are incremented in the blocks 210, 214, and 218, respectively, of the method 200. For example, a low value M of the command counter may indicate a potential victim of involuntary domestic servitude or a visitor to the geofenced area corresponding to the IVA 120. A high value M of the command counter typically points to an occupant of the geofenced area corresponding to the IVA 120. A high value N of the CAB counter may point to a potential perpetrator of involuntary domestic servitude. A high value K of the non-interaction counter may indicate a potential victim of involuntary domestic servitude. The method 300 is described below with continued reference to FIGS. 1-3.

In one instance, the electronic processor 126 selects a voiceprint for labeling (in a block 302). In one example, different voiceprints stored in the memory 128 of the IVA 120 are selected in the block 302, one at a time, in a suitable order. The method 300 also includes the electronic processor 126 reading the values of the command, CAB, and non-interaction counters corresponding to the selected voiceprint (in a block 304).

In some instances, the electronic processor 126 labels the selected voiceprint with one or more digital tags (in a block 306). The labeling is performed based on the values of the corresponding command, CAB, and non-interaction counters read in the block 304. In one example, the following labeling scheme is used in the block 306. When the command counter value M of the selected voiceprint is greater than a threshold value $M_1$, i.e., $M>M_1$, the voiceprint is labeled with the "IVA interactor occupant" tag. When the CAB counter value N of that voiceprint is greater than a threshold value $N_1$, i.e., $N>N_1$, the voiceprint is additionally labeled with the "potential suspect" tag. When the command counter value M of the selected voiceprint is smaller than the threshold value $M_0$, and the non-interaction counter value K of that voiceprint is greater than a threshold value $K_1$, i.e., $M<M_0$ and $K>K_1$, the voiceprint is labeled with the "IVA non-interactor occupant" tag. Recall that the threshold value $M_0$ is used in the block 216 of the method 200. When neither of the "IVA interactor occupant" tag and "IVA non-interactor occupant" tag is applicable to the selected voiceprint, the voiceprint is labeled with the "non-occupant" tag.

In some instances, the threshold values $M_0$, $M_1$, $K_1$, and $N_1$ are used as algorithm parameters that can be appropriately selected during the algorithm design stage. In some instances, speech of an occupant of the geofenced area corresponding to the IVA 120 is likely to be picked up by the microphone 124 on numerous occasions, thereby causing the M or K value of the corresponding voiceprint to be relatively large. In contrast, speech of a non-occupant is likely to be picked up by the microphone 124 relatively infrequently, thereby causing the M or K value of the corresponding voiceprint to be relatively small. If the speech of the occupant also exhibits the above-mentioned CAB patterns (also see the block 214, FIG. 2) coupled with certain additional personal characteristics described below, then the "potential suspect" label is warranted. The presence of an occupant that does not command the IVA 120 is rare, and this occupant might fall into the category of "potential human trafficking victim," which usually justifies further responsive actions, some examples of which are described in more detail below. In other examples, other labeling schemes, counters, and interpretations are used as well.

In some instances, the electronic processor 126 determines (in a decision block 308) whether there is another voiceprint that needs to be labeled. When no additional voiceprints need to be labeled ("No" at the decision block 308), the method 300 is terminated. When additional voiceprints need to be labeled ("Yes" at the decision block 308), the processing of the method 300 is directed back to the block 302.

FIG. 4 is a flowchart illustrating a method 400 of determining the number of people present in the geofenced area of the IVA 120 according to example embodiments. In one example, the method 400 is implemented using the server 150. An example scenario in which the method 400 can be invoked includes a situation in which first responders are called to the geofenced area of the IVA 120 due to an incident therein, such as a fire or report of some unlawful activity. The first-responder team approaching the geofenced area accesses the server 150 via the network 110 with a request to query the IVA 120, for example, about the number of people present thereat and possibly other pertinent information (when available), such as presence of probable perpetrators and/or victims of involuntary domestic servitude. The query response received from the IVA 120 can then be beneficially used by the first-responder team to appropriately orient themselves for delivering a better or more appropriate response to the call.

The method 400 includes the electronic processor 154 receiving a request for access to the IVA data (in a block 402). The request typically specifies the physical address to which the first-responder team is heading. The electronic processor 154 then operates to translate the physical address to a corresponding network address (in the block 402). The network address is then used (in the block 402) to identify the IVA 120 for the possible query.

In one instance, the electronic processor 154 determines whether the server 150 is authorized and configured to access the pertinent data of the IVA 120 (in a decision block 404). When the server 150 is authorized and configured to access the data ("Yes" at the decision block 404), the processing of the method 400 is directed to a block 406. When the server 150 is not authorized or configured to access the data ("No" at the decision block 404), the processing of the method 400 is directed to a block 408.

In some instances, the electronic processor 154 sends (in the block 406), via the I/O interface 156, a query to the IVA 120 regarding about the number of people present thereat and other pertinent information (if available). In some other instances, the method 400 includes the electronic processor 154 sending (in the block 408) a negative response to the request of the block 402, with the negative response advising the first-responder team to use public records and/or redirecting the request to a suitable public database.

In some instances, the method 400 includes the electronic processor 154 receiving the query response from the IVA 120 and directing the received query response to the requester (in a block 410). In one example, to generate the query response, the electronic processor 126 of the IVA 120 uses the timestamps associated with various voiceprints stored in the memory 128 to identify the voiceprints that have been active recently, e.g., during the last hour. The electronic processor 128 then specifies the total number of such recently active voiceprints in the query response as an estimate for the number of people currently present in the geofenced area of the IVA 120.

In some examples, the electronic processor 128 of the IVA 120 also operates to include additional information into the query response sent to the server 150. For example, the query response may specify an estimated number of occupants in the geofenced area of the IVA 120. The electronic processor 126 can estimate this number by counting the total number of voiceprints labeled with the IVA interactor occupant tag and the IVA non-interactor occupant tag. For the relevant voiceprints of relatively high quality, the electronic processor 126 may additionally include in the query response the corresponding personal characteristics of the corresponding individuals, such as the individual's age, gender, etc.

In various embodiments, the IVA 120 and/or the server 150 may be configured to implement one or more of the following features:
  (i) Store copies of the voiceprints labeled with the IVA non-interactor occupant tag in the memory 152 of the server 150 or in the cloud storage of the network 110 as potential evidence;
  (ii) Compare the voiceprints of the feature (i) with voiceprints of missing persons (when available) for a possible match;
  (iii) Provide annotations to the reported IVA data to flag certain known issues associated with the geofenced area (e.g., a household) of the IVA 120, such as autism, dementia, and the like. For example, some of such issues may cause some voiceprints to be incorrectly labeled;
  (iv) In response to a trigger event, transmit, to an API of a governmental agency, a message with an alert reporting a large value of the N counter (also see blocks 214, 216 of the method 200, FIG. 2);
  (v) Configure the system to respond to a plurality of trigger events, e.g., including: (a) a citizen's complaint regarding the geofenced area of the IVA 120; (b) an emergency call regarding the geofenced area; (c) a warrant to monitor the geofenced area; (d) the estimated number of occupants being greater than a first applicable threshold value; and (e) the number of voiceprints labeled with the non-occupant tag being greater than a second applicable threshold value;
  (vi) Implement sentimental analyses of the background speech picked up by the microphone 124 to detect the aggressive or threatening posture corresponding to the speech; and
  (vii) Provide different optimal sets of threshold values for different deployment scenarios.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An apparatus implementing an interactive virtual assistant (IVA), the apparatus comprising:
   a microphone to convert received sound into electrical signals;
   a communication interface; and
   an electronic processor connected to the microphone and the communication interface and configured to:
      generate a plurality of voiceprints corresponding to a plurality of voices represented in the electrical signals;
      distinguish, in the electrical signals, signals representing background speech and signals representing voice commands directed at the IVA;
      based on the signals representing background speech and the signals representing voice commands, label each of the voiceprints with a tag selected from the group consisting of an IVA interactor occupant tag, an IVA non-interactor occupant tag, and a non-occupant tag; and
      in response to a trigger event, transmit, through the communication interface, a message with at least one of:
         an estimated number of occupants in a geofenced area corresponding to the IVA; and
         an alert reporting an indication of unlawful activity in the background speech,
   wherein the indication of unlawful activity is attributed to a first subset or a second subset of the plurality of voiceprints, the first subset being labeled with the IVA interactor occupant tag, the second subset being labeled with the non-occupant tag.

2. The apparatus of claim 1,
   wherein the electronic processor is further configured to convert a signal representing a voice command into a corresponding device command; and
   wherein the apparatus is configured to execute the device command.

3. The apparatus of claim 1, wherein, for a voiceprint labeled with the IVA interactor occupant tag or the IVA non-interactor occupant tag, the electronic processor is configured to determine a characteristic selected from the group consisting of a corresponding person's age, gender, accent, dialect, and speech abnormality.

4. The apparatus of claim 1, wherein the electronic processor is configured to compute the estimated number of occupants by summing a number of voiceprints labeled with the IVA interactor occupant tag and a number of voiceprints labeled with the IVA non-interactor occupant tag.

5. The apparatus of claim 1, wherein the trigger event is an event selected from the group consisting of:
   a citizen's complaint regarding the geofenced area;
   an emergency call regarding the geofenced area;
   a warrant to monitor the geofenced area;
   the estimated number of occupants being greater than a threshold value; and
   a number of voiceprints labeled with the non-occupant tag being greater than another threshold value.

6. The apparatus of claim 1, wherein the indication of unlawful activity includes at least one of:

an aggressive or threatening posture in the background speech attributed to a voiceprint of the first subset; and higher than a threshold usage of a keyword in the background speech attributed to the first and second subsets.

7. The apparatus of claim 6, wherein the keyword indicates coercion, manipulation, exploitation, or explicitly unlawful activity.

8. The apparatus of claim 1, wherein the message is directed to a law-enforcement agency or a child welfare agency.

9. A method of processing information captured by an interactive virtual assistant (IVA), the method comprising:

converting sound received by a microphone into electrical signals;

generating, with an electronic processor, a plurality of voiceprints corresponding to a plurality of voices represented in the electrical signals;

distinguishing, with the electronic processor, in the electrical signals, signals representing background speech and signals representing voice commands directed at the IVA;

based on the signals representing background speech and the signals representing voice commands, labeling, with the electronic processor, each of the voiceprints with a tag selected from the group consisting of an IVA interactor occupant tag, an IVA non-interactor occupant tag, and a non-occupant tag; and in response to a trigger event, transmitting, through a communication interface connected to the electronic processor, a message with at least one of:

an estimated number of occupants in a geofenced area corresponding to the IVA; and an alert reporting an indication of unlawful activity in the background speech, wherein the indication of unlawful activity is attributed to a first subset or a second subset of the plurality of voiceprints, the first subset being labeled with the IVA interactor occupant tag, the second subset being labeled with the non-occupant tag.

10. The method of claim 9, further comprising:

converting, with the electronic processor, a signal representing a voice command into a corresponding device command; and causing the IVA to execute the device command.

11. The method of claim 9, further comprising, for a voiceprint labeled with the IVA interactor occupant tag or the IVA non-interactor occupant tag, determining, with the electronic processor, a characteristic selected from the group consisting of a corresponding person's age, gender, accent, dialect, and speech abnormality.

12. The method of claim 9, further comprising computing, with the electronic processor, the estimated number of occupants by summing a number of voiceprints labeled with the IVA interactor occupant tag and a number of voiceprints labeled with the IVA non-interactor occupant tag.

13. The method of claim 9, wherein the trigger event is an event selected from the group consisting of:

a citizen's complaint regarding the geofenced area;

an emergency call regarding the geofenced area;

a warrant to monitor the geofenced area;

the estimated number of occupants being greater than a threshold value; and a number of voiceprints labeled with the non-occupant tag being greater than another threshold value.

14. The method of claim 9, wherein the trigger event is generated in response to detecting one or more predetermined elements associated with human trafficking within the plurality of voiceprints.

15. A non-transitory computer-readable medium storing instructions that, when executed by the electronic processor, cause the electronic processor to perform operations comprising the method of claim 9.

16. An apparatus implementing an interactive virtual assistant (IVA), the apparatus comprising:

a microphone to convert received sound into electrical signals;

a communication interface; and an electronic processor connected to the microphone and the communication interface and configured to:

generate a plurality of voiceprints corresponding to a plurality of voices represented in the electrical signals;

distinguish, in the electrical signals, signals representing background speech and signals representing voice commands directed at the IVA;

based on the signals representing background speech and the signals representing voice commands, label each of the voiceprints with a tag selected from the group consisting of an IVA interactor occupant tag, an IVA non-interactor occupant tag, and a non-occupant tag;

in response to a trigger event, transmit, through the communication interface, a message with at least one of:

an estimated number of occupants in a geofenced area corresponding to the IVA; and an alert reporting an indication of unlawful activity in the background speech; and label a voiceprint with the IVA interactor occupant tag in response to:

counting a first number of instances in which said voiceprint is present in the background speech, the first number being greater than a threshold value; and counting a second number of voice commands corresponding to said voiceprint, the second number being greater than another threshold value.

17. An apparatus implementing an interactive virtual assistant (IVA), the apparatus comprising:

a microphone to convert received sound into electrical signals;

a communication interface; and an electronic processor connected to the microphone and the communication interface and configured to:

generate a plurality of voiceprints corresponding to a plurality of voices represented in the electrical signals;

distinguish, in the electrical signals, signals representing background speech and signals representing voice commands directed at the IVA;

based on the signals representing background speech and the signals representing voice commands, label each of the voiceprints with a tag selected from the group consisting of an IVA interactor occupant tag, an IVA non-interactor occupant tag, and a non-occupant tag;

in response to a trigger event, transmit, through the communication interface, a message with at least one of:

an estimated number of occupants in a geofenced area corresponding to the IVA; and an alert reporting an indication of unlawful activity in the background speech; and label a voiceprint with the IVA non-interactor occupant tag in response to:
- counting a first number of instances in which said voiceprint is present in the background speech, the first number being greater than a threshold value; and
- counting a second number of voice commands corresponding to said voiceprint, the second number being smaller than another threshold value.

18. An apparatus implementing an interactive virtual assistant (IVA), the apparatus comprising:
a microphone to convert received sound into electrical signals;
a communication interface; and
an electronic processor connected to the microphone and the communication interface and configured to:
- generate a plurality of voiceprints corresponding to a plurality of voices represented in the electrical signals;
- distinguish, in the electrical signals, signals representing background speech and signals representing voice commands directed at the IVA;
- based on the signals representing background speech and the signals representing voice commands, label each of the voiceprints with a tag selected from the group consisting of an IVA interactor occupant tag, an IVA non-interactor occupant tag, and a non-occupant tag; and
- in response to a trigger event, transmit, through the communication interface, a message with at least one of:
  - an estimated number of occupants in a geofenced area corresponding to the IVA; and
  - an alert reporting an indication of unlawful activity in the background speech,
wherein the trigger event is generated in response to detecting one or more predetermined elements associated with human trafficking within the plurality of voiceprints.

19. A method of processing information captured by an interactive virtual assistant (IVA), the method comprising:
converting sound received by a microphone into electrical signals;
generating, with an electronic processor, a plurality of voiceprints corresponding to a plurality of voices represented in the electrical signals;
distinguishing, with the electronic processor, in the electrical signals, signals representing background speech and signals representing voice commands directed at the IVA;
based on the signals representing background speech and the signals representing voice commands, labeling, with the electronic processor, each of the voiceprints with a tag selected from the group consisting of an IVA interactor occupant tag, an IVA non-interactor occupant tag, and a non-occupant tag;
in response to a trigger event, transmitting, through a communication interface connected to the electronic processor, a message with at least one of:
- an estimated number of occupants in a geofenced area corresponding to the IVA; and
- an alert reporting an indication of unlawful activity in the background speech; and causing the electronic processor to label a voiceprint with the IVA interactor occupant tag in response to:
- counting a first number of instances in which said voiceprint is present in the background speech, the first number being greater than a threshold value; and
- counting a second number of voice commands corresponding to said voiceprint, the second number being greater than another threshold value.

20. A method of processing information captured by an interactive virtual assistant (IVA), the method comprising:
converting sound received by a microphone into electrical signals;
generating, with an electronic processor, a plurality of voiceprints corresponding to a plurality of voices represented in the electrical signals;
distinguishing, with the electronic processor, in the electrical signals, signals representing background speech and signals representing voice commands directed at the IVA;
based on the signals representing background speech and the signals representing voice commands, labeling, with the electronic processor, each of the voiceprints with a tag selected from the group consisting of an IVA interactor occupant tag, an IVA non-interactor occupant tag, and a non-occupant tag;
in response to a trigger event, transmitting, through a communication interface connected to the electronic processor, a message with at least one of:
- an estimated number of occupants in a geofenced area corresponding to the IVA; and
- an alert reporting an indication of unlawful activity in the background speech; and causing the electronic processor to label a voiceprint with the IVA non-interactor occupant tag in response to:
- counting a first number of instances in which said voiceprint is present in the background speech, the first number being greater than a threshold value; and
- counting a second number of voice commands corresponding to said voiceprint, the second number being smaller than another threshold value.

\* \* \* \* \*